Patented Aug. 12, 1952

2,606,890

UNITED STATES PATENT OFFICE 2,606,890

PRODUCTION OF HIGH MOLECULAR WEIGHT CARBOXYLIC ACIDS AND THEIR DERIVATIVES

Orville L. Polly and Orin D. Cunningham, Long Beach, Calif., assignors to Union Oil Company of California, Los Angeles, Calif., a corporation of California No Drawing. Application December 15, 1949, Serial No. 133,216

21 Claims. (Cl. 260—75)

This invention relates to high molecular weight carboxylic acids and to methods for their production.

The invention further relates to useful compositions and products containing such high molecular weight carboxylic acids and to derivatives and/or reaction products of such acids. More particularly the invention relates to methods for the production and resolution of oxidized petroleum wax whereby particular acid fractions are obtained, which fractions are useful as chemical intermediates, as plasticizing and/or modifying agents for synthetic resins and as polymerization modifiers or copolymerization agents to be used in the preparation of useful synthetic resin materials.

The invention further relates to the reactions of acid fractions obtained by oxidizing petroleum wax and to the reaction products which have value as drying oils and/or drying oil modifiers.

In general, the oxidation of both liquid and solid paraffinic hydrocarbons by blowing with an oxygen-containing gas is old. However, in oxidizing paraffin wax it has in the past been the practice to oxidize the wax to a limited degree with the object of producing fatty acids which can be recovered and converted into glycerides or fats. In such oxidation reactions the conditions are controlled so that the acid number of the product is carried to not more than about 80 to 90 mg. KOH/g., at which time the oxidation is discontinued, acids are removed from the oxidized wax and the non-acidic portion of the oxidate is either discarded or returned to the oxidizer with additional quantities of fresh wax for further oxidation.

It has been found that by a suitable choice of feed stocks and conditions of oxidation that the oxidation may be directed to the selective production of a mixture of high molecular weight carboxylic acids having properties different from the fatty acids which have previously been the acids sought to be obtained by wax oxidation. Thus in the prior art methods, 60% to 70% of the paraffin wax remains unoxidized, the acid number of the crude oxidate is generally around 60 to 65 mg. KOH/g. and the saponification number about 130 mg. KOH/g., and the acid fraction, after separation of unoxidized wax, contains about 90% of fatty acids and about 10% of more highly oxidized materials. Following the methods outlined herein, 95 to 100% of the paraffin wax is oxidized, the crude oxidate before water washing has an acid number of about 240 to 300 mg. KOH/g. and a saponification number of about 350 to 600 mg. KOH/g. and the purified neutral free acids, i. e. acids from which non-acidic materials have been removed, contain about 10% or less of fatty acids and 90% or more of oxy, oxo and poly acids. Moreover, the oxidate as well as the purified fatty acids obtained by prior art processes are normally solid materials whereas the oxidate is a non-waxy fluid material and the purified acids obtained following the teachings of this invention are normally liquid at ordinary temperatures.

It has been found further that the acids produced by the processes of this invention possess physical and chemical properties which are unique among acids obtained by liquid phase oxidation of hydrocarbons, and that these acids may be readily converted into products having drying oil characteristics, and further that they may be copolymerized with various polymerizable materials such as unsaturated hydrocarbons, aldehydes and the like, particularly following a heat treatment to effect dehydration and possibly dehydroxylation.

It is thus a primary object of this invention to provide a method for synthesis of high molecular weight carboxylic acids, having properties different from fatty acids, from paraffin wax.

Another object of the invention is to provide a method for the oxidation of a selected petroleum wax whereby high yields of such high molecular weight carboxylic acids are obtained.

Another object of the invention is to provide a process for the production of partially unsaturated high molecular weight carboxylic acids, which acids are capable of polymerization, to some extent at least, by themselves and are readily copolymerized with other polymerizable materials to produce modified syntheic resins of improved characteristics.

Another object of the invention is to provide a method for the synthesis of synthetic drying oils and/or synthetic drying oil modifiers.

A further object of this invention is to provide a process for the esterification of high molecular weight carboxylic acids obtained by the oxidation of paraffin wax under conditions such that the resulting esters have drying oil characteristics.

It is a further object of this invention to provide new and useful polymers from acids obtained by the controlled liquid phase oxidation of paraffin wax.

It is an object of this invention to react mono or polyfunctional alcohols with high molecular weight carboxylic acids obtained by the controlled liquid phase oxidation of paraffin wax in the presence of an added agent which prevents gelation of the reaction product. It is an object of this invention to employ organic acids and specifically organic acids having more than 8 carbon atoms and containing conjugated diene groups, particularly rosin, in such reactions and also to employ non-acidic substances containing a conjugated diene group, particularly styrene, in such reaction.

This invention involves the controlled oxidation of a petroleum wax, air blowing the melted wax at moderate temperatures until a relatively high acid content has been obtained, and separating the resulting oxidized wax to obtain fractions containing the desired high molecular weight carboxylic acids having the properties described herein.

In the preferred modification the separation of the desired mixture of high molecular weight carboxylic acids is accomplished by water washing the oxidized wax to obtain a water-insoluble wax oxidation product and subsequently separating the water-insoluble fraction into at least two fractions. This latter separation may be effected by either of two general methods of treatment. In selecting these methods of separation consideration is given to methods which will effect the desired separation without causing inter or intra esterification of the acids and without causing any change in the molecular size or configuration of the acid molecules.

In the first method the water-insoluble fraction of the oxidation product is separated into a naphtha-soluble fraction and a naphtha-insoluble fraction. In this case the water-insoluble fraction is extracted at least once and preferably two or more times with from 1 to 4 or 5 volumes of pentane or hexane or a fraction of hydrocarbons containing one of these materials in order to separate a fraction of the wax oxidate, which will be referred to herein as a "naphtha-insoluble fraction," from the naphtha-soluble materials. A light petroleum naphtha or thinner or a light gasoline fraction of petroleum boiling within the range of about 70° C. to 116° C. may be employed as the solvent in this separation and the insoluble fraction of acidic material obtained is substantially the same as that obtained with specific hydrocarbons or fractions mentioned. The naphtha-insoluble fraction consists essentially of high molecular weight carboxylic acids relatively free from neutral or non-acidic materials. This fraction of acids, which comprises the preferred acids of this invention, contains more oxygen than would be indicated to be necessary on the basis of carboxylic acid groups and this neutral oxygen appears to be removable by controlled heat treatment with the formation of unsaturated groupings as described hereinbelow.

A second method of separating the desirable high molecular weight carboxylic acids from the water-insoluble portion of oxidized wax consists in extracting the water-washed oxidized wax with a concentrated aqueous solution of an alkali metal borate such as sodium borate. The desired high molecular weight carboxylic acids appear to form a complex with the borate and are solubilized in the aqueous borate phase. Neutral constituents and undesirable acidic constituents are separated as an oily phase. Following this extraction the borate solution is acidified with a strong mineral acid such as sulfuric acid or hydrochloric acid and the desirable high molecular weight carboxylic acids are liberated from the borate complex and separated as an oily phase which may be decanted from the acidified aqueous borate solution. The acid fraction obtained in this manner is found to be insoluble in hexane and relatively free from neutral constituents and for the purposes of this invention it is substantially equivalent to the fraction separated by extraction with hexane, gasoline or the like.

The acid fraction separated either by the borate extraction method or the naphtha extraction method will be referred to herein as the naphtha-insoluble fraction of oxidized paraffin wax. This fraction has particular utility in the preparation of various types of ester derivatives which fall generally into two groups, i. e. esters of mono or polyfunctional alcohols which are produced by esterifying the high molecular weight carboxylic acids with alcohols and particularly with glycerol, pentaerythritol, mannitol and the like, and the mono or polyfunctional alcohol esters of at least partially unsaturated, i. e. dehydroxylated high molecular weight carboxylic acids which are at least partially polymerized. The esters which may be saturated or unsaturated are useful as plasticizers, drying oils, and in linoleum "cement" compositions and the like. The polymerized unsaturated esters, which term will include the products of copolymerization of unsaturated acids and esters with other polymerizable materials, yield useful plastics and synthetic resins which may be used in floor covering composition, paints, varnishes, protective coatings, molded articles and the like. The invention relates to the method for the production of the mentioned esters, unsaturated esters, polymers and also to the catalysts and reaction conditions which favor the specific production of the particular products.

It is to be understood that the acid fraction referred to herein as the naphtha-insoluble portion of wax oxidate comprises primarily carboxylic acids of relatively high molecular weight, i. e. having between about 8 and 50 or 60 carbon atoms per molecule and that these acids differ from high molecular weight fatty acids, both in their physical and chemical properties. This fraction has an acid number between about 145 and 185 mg. KOH/g. and is found to have a ratio of total oxygen to carboxyl oxygen between about 1.4 and 1.6. It is believed that this fraction of acids contains acids having hydroxyl groups since, on heating, it is observed that water is apparently eliminated from the acid molecule, leaving unsaturated linkages. Moreover, upon heating it is found that the ratio of total oxygen to carboxyl oxygen decreases and may be reduced to a ratio of 1 or at least to 1.25.

Further evidence that hydroxyl groups are present in the acids of this invention and that these hydroxyl groups can be removed to produce unsaturated acids or esters, depending upon whether the acid fraction has first been esterified, is obtained in the following manner. The naphtha-insoluble fraction of wax oxidate was converted into its methyl ester according to methods described herein and the methyl ester analyzed for hydroxyl oxygen by means of the Zerewitinoff method. This method of analysis is described by Kohler et al., J. A. C. S., vol. 49, page 3181 (1927). It was found that a typical fraction contained 30 mg. of hydroxyl oxygen per gram of substance. The fraction was then subjected to dehydroxylation treatment such as described herein, after which analysis showed no hydroxyl oxygen remained. An olefin determination using hydrogenation procedures showed the presence of the theoretical amount of unsaturation which would be obtained by removal of the hydroxyl groups indicated by the Zerewitinoff analysis.

The acids produced by the processes of this invention also appear to contain inner esters which may be lactones, lactides and the like. This is evidenced by the fact that the desired acid fraction normally has a saponification number to acid number ratio of between about 1.6 and 2.2 to 1. Applicants are not to be limited, however, by their interpretation of the composition of the described acid fraction since their invention resides in the mixture of acids prepared in the manner described herein, in the methods of preparing this acid fraction, in the methods of converting these acids into the various reaction products or derivatives described and in such products or derivatives themselves. Thus, the invention resides primarily in the unique acids produced by controlled oxidation of selected paraffin wax, which acids may be separated from the oxidized product as a fraction insoluble in naphtha or gasoline, regardless of what the specific chemical structure of the acids may be. Applicants have found that these acids are not only different from acid fractions heretofore produced but that they have utility in the preparation of various products referred to herein.

The paraffin wax employed in the preparation of the acids of this invention should be relatively oil-free and should be substantially free from hydrocarbons containing aromatic rings. A suitable wax is one which has been prepared by modern solvent refining technique. Thus, a topped waxy residuum is extracted with liquified propane to separate asphaltic materials from the oil and the deasphalted oil in propane solution is subsequently chilled to temperatures in the neighborhood of −40° to crystallize wax which may then be separated from the propane-oil solution. The precipitated wax, which contains oil, is dissolved in a solvent such as methyl ethyl ketone and chilled to precipitate a deoiled wax. Such dewaxing and deoiling processes are well known and are generally described in U. S. Patent No. 2,229,658. The wax thus obtained by this and other solvent refining processes is relatively free of objectionable materials for wax oxidation purposes. The melting point of the refined wax is generally above 32° C. and may be as high as 75° C. or even higher. Refined paraffin waxes having melting points in the range of about 45° C. to 75° C. are available on the market and are desirable oxidation stocks for use in the preparation of the acids of this invention. Although solvent refining gives a very desirable wax, waxes refined by other methods and from other sources may be used in the process of this invention. Such other waxes include refined tank bottoms wax, sucker rod wax, and waxes derived from other petroleum materials. Preferably, the waxes employed as feed stocks will have a melting point between about 55° C. and 75° C., although, as indicated above, lower and higher melting point waxes may be employed, i. e. waxes melting as low as 32° C. such as those obtainable from lighter fractions of petroleum, as well as refined tank bottoms which may have a melting point as high as about 93° C. to 95° C.

The above described waxes comprise predominantly paraffinic and isoparaffinic hydrocarbons having between about 15 and 50 carbon atoms per molecule. Preferably, the wax to be employed will contain hydrocarbon molecules having between about 20 and about 35 carbon atoms per molecule.

The oxidation of the paraffin wax is carried out in the liquid phase at a temperature above the melting point of the wax and below 140° C. The preferred temperature is between about 100° C. and 130° C. and it is in this temperature range that the greatest yield of the desired acids is obtained. Higher temperatures promote the decomposition or the further modification of the desired acidic materials. Moreover, the extent of oxidation appears to be important. Thus, the oxidation of the wax which is effected by air blowing the wax at a temperature within the limit described and at a pressure between atmospheric pressure and 15 or 20 atmospheres is continued until the acid number of the oxidized material is between 240 and 300 mg. KOH/g. Preferably, the acid number of the oxidized material will be between 250 and 290 mg. KOH/g. If the oxidation is discontinued at acid numbers below about 240 mg. KOH/g., the yield of the desired products is negligible or at least low and the yield of naphtha-soluble acids is high, whereas if the oxidation is continued beyond the upper limit of acid number mentioned the rate of production of the desired acids appears to decrease to an uneconomical point.

The term "acid number" as used herein represents the numerical value of the acidity and is determined by the method described in A. S. T. M. Standards on Petroleum Products and Lubricants, October 1947, page 639. The term "saponification number" as used herein is the saponification equivalent as determined by the method described in A. S. T. M. Standards on Petroleum Products and Lubricants, October 1947, page 639.

In preparing a typical wax oxidate from which the desirable acids may be recovered, a refined paraffin wax as above described having a melting point of 145° F. is melted and introduced into a closed reaction vessel which is equipped with means for heating and cooling the contents. The vessel is preferably in the form of a vertical column provided with heating coils in the lower portion, with means for introducing and dispersing air at a point near the bottom of the vessel, and with means for removing spent air and light oxidation products from a point at or near the top of the column. There may be cooling means, as for example cooling coils, located in the air space at the top of the column which may be employed to break foam if foaming occurs during the oxidation and to effect a knock-back or reflux of the heavier vapors leaving the oxidation vessel. The melted wax in the oxidation vessel is heated to a temperature between about 100° C. and 130° C. by means of steam in the heating coils at the base of the column and a gas containing free oxygen, as for example air, is passed into the bottom of the vessel under pressure through a distributor, i. e. a porous ceramic, glass or steel plate, which insures adequate dispersion of the air in the liquid being oxidized. Spiders containing numerous relatively small holes may be employed as an air distributing means in large installations. However, the use of porous plates and the like has been found to improve air distribution and is, therefore, desirable.

The rate at which air or other oxidizing gas is introduced may be varied considerably without affecting the resulting oxidation. Rates between about 1 and about 20 standard cubic feet of air per barrel of hydrocarbon per minute have been found to give satisfactory results. The barrel referred to is the 42-gallon barrel of the petroleum industry. The preferred air rate is between about 5 and 15 standard cubic feet per barrel per minute. Oxidation is continued within the temperature limits and pressure limits indicated until the acid number of the liquid in the oxidizer is within the limits described. This may require as much as 100 to 300 hours, depending upon the temperature and pressure of oxidation as well as on the rate of air blowing, the type of wax employed and whether or not a small amount of oxidized or partially oxidized wax from the previous batch was added at the start of the oxidation period in order to reduce the induction period.

The spent air containing low molecular weight oxidation and degradation products may be run to waste or the effluent gases and vapors from the oxidizer may be passed through a condenser or other recovery unit where the low molecular weight oxidation products are removed from the spent air. These materials will include water, low molecular weight aldehydes, such as formaldehyde, acetaldehyde and the like, and low molecular weight acids, as for example formic, acetic and propionic acid and higher homologs of these acids. The recovery and refining of these materials may be carried out according to conventional processes.

Following the initiation of the oxidation reaction, less heat is required to maintain the desired temperature because of heat developed by the reaction. Thus, it is sometimes necessary to discontinue heating and remove heat by cooling the reactor to maintain the desired temperature. Whether the operation is carried out exothermically or endothermically is largely determined by the pressure of the operation, temperature, and the amount of air or other oxygen-containing gas employed in the reaction as well as the size of the oxidation vessel.

The oxidation operation, above described as a batch process conducted in a single vessel, may be conducted on a continuous basis in a series of smaller vertical reaction vessels, each equipped for heating and cooling and provided with means for introduction of the gas containing oxygen. The paraffin wax may be passed successively through the series of vessels to undergo oxidation. The advantages offered by such a mode of operation include among others a steady flow of product, a uniform product quality, and the ease of control of the operation.

Following the oxidation the wax is removed from the oxidation vessel and washed with water to remove water-soluble components. This washing operation appears to remove low molecular weight fatty acids, hydroxy acids, poly acids and other oxygenated low molecular weight degradation products. The water washing is preferably conducted at or near the boiling point of water where the oxidized product is in a liquid condition. Usually it is desirable to employ 2 or more washes using 2-10 volumes of water per volume of oxidized wax. Any conventional apparatus may be used in which to carry out the water washing. A conventional extraction column may be employed or a series of mixing and settling vessels may be used. The temperature of extraction may be above the boiling point of water, in which case sufficient pressure is employed to prevent volatilization or boiling of the water. Following the water extraction the aqueous phase is separated from the water-insoluble oily phase and the material may be heated to somewhat elevated temperatures, as for example 110° C. to about 150° C., to effect dehydration of the water-insoluble fraction. Generally, it is desirable not to heat the oxidate to temperatures above about 105° C. to 120° C. in order to prevent chemical change and possible decomposition of the oxidized material. Dehydration may be effected at these or even lower temperatures by using vacuum. The water-washed product will have an acid number between about 130 and 190 mg. KOH/g., depending upon the extent of oxidation. An oxidized wax having an acid number of about 250 and a saponification number of about 370 will generally produce a water-washed wax oxidate having an acid number of about 150 to 160 and a saponification number of about 270.

The water-washed oxidate will contain oxygenated products having from about 8 to about 50 carbon atoms per molecule. This water-washed wax oxidate may be employed without further treatment in many of the reactions described herebelow since it contains relatively large proportions of the desired high molecular weight acidic materials. However, the water-washed product is preferably further fractionated as indicated hereinabove to obtain a fraction rich in naphtha-insoluble acids and relatively free from naphtha-soluble acidic materials, neutral oxygenated materials and wax. In effecting this further separation, the water-washed oxidized wax, following decantation from the aqueous water extract, is extracted or washed with 2 to 10 volumes of a low molecular weight hydrocarbon or hydrocarbon fraction such as described hereinabove, as for example a hexane fraction of petroleum. The temperature of extraction will be above the melting point of the water-washed oxidized wax and preferably below about 60° C. This extraction may be carried out at ordinary atmospheric pressures or may be effected in closed vessels under pressure at higher temperatures, as for example temperatures as high as 125° C. Since the oxidized wax mixture has a melting point of about 45° C., temperature limits for this extraction will be above 45° C. This extraction may be repeated if desired to increase the purity of the naphtha-insoluble fraction. Thus, the once-extracted fraction may, if desired, be re-extracted one or more times with 1 to 10 volumes of the hydrocarbon solvent to remove residual hydrocarbon-soluble components. The hydrocarbon-insoluble fraction will contain from 85% to 95% by weight of molecules containing carboxylic acid groupings and correspondingly between about 5% and 15% by weight of neutral materials which may consist of neutral esters and/or oxygenated molecules which do not contain carboxylic acid groups.

The following example indicates the relatively low proportion of non-carboxylic substances present in the naphtha-insoluble fraction. A 160 lb. portion of water-washed wax oxidate having an original acid number of 250 mg. KOH/g. was thoroughly agitated with 60 gals. of a straight run gasoline having a boiling range of 70° to 110° C. and the gasoline phase decanted. A second 25 gal. portion of the gasoline was added and thoroughly mixed with the once-extracted acids. After separation of the solvent phase and heating to remove residual solvent, 68 lbs. of solvent-free naphtha-insoluble product was obtained. The resulting product contained about 7% of non-carboxylic substances as indicated by neutralizing a sample of the acids and extracting the soaps with ethyl ether to remove non-soap materials. Where further purification is desirable the hydrocarbon-insoluble fraction may be treated with sodium hydroxide to convert the acids into their sodium soaps or salts and the sodium hydroxide solution extracted with additional hydrocarbon solvent to remove unsaponified materials. The resulting purified soap solution may then be acidified to release the naphtha-insoluble acids which are substantially free from non-acidic impurities.

The alternative method for the separation and purification of the desired high molecular weight naphtha-insoluble acids from wax oxidation products is based on the fact that these compounds are apparently selectively separated from naphtha-soluble acids and non-acidic oxidation products present in the oxidized wax by extraction with aqueous alkali metal borate solution; sodium borate is particularly useful in this regard. The extraction may be effected in either of two ways, each of which has advantages over the other process. In one case, the molten water-washed oxidized wax is dispersed in a hydrocarbon solvent such as a light gasoline fraction and this dispersion is extracted with the metal borate solution. In this method of treatment the neutral materials appear to be more completely eliminated from the desired fraction of naphtha-insoluble acids. In the second method the molten wax is directly mixed with borate solution and hydrocarbon solvent is subsequently added to the mixture to effect extraction of naphtha-soluble acids and neutral materials from the aqueous borate phase. This method of treatment has the advantage of forming the complex in a relatively concentrated medium, thereby obtaining a more rapid reaction. However, the purity of the acids obtained in this alternative process is not as great as when the wax oxidate is first diluted with naphtha and subsequently extracted with aqueous borate.

The advantages of the borate extraction over other methods of separating naphtha-insoluble acids from wax oxidation products are primarily that such a process is simple and economical in that spent borate solutions are recoverable, almost quantitatively, and that the products obtained, i. e. the naphtha-insoluble fractions, appear to be obtained in relatively pure form with the almost complete elimination of neutral materials and of naphtha-soluble acidic materials. This extraction does not result in emulsion formation which is typical of ordinary neutralization and acidification processes and, because of the high specific gravity of the borate solutions, no difficulty is encountered in obtaining excellent phase separation.

The chemistry involved in the borax separation is not understood. However, it is believed that a molecular complex of some character is formed by the borate, particularly sodium tetraborate, and the particular acids which are separated and referred to as naphtha-insoluble acids. Analyses indicate that between about 1 and 3 equivalents of acids are taken up in the complex per mol of borax. That some sort of complex is formed is indicated by changes in the electrical conductivity of the borate solution following extraction. The electrical conductivity of the complexes appears to be greater than that of the borate solution alone.

In the preferred method of borax refining, the water-washed oxidized wax is heated to, or maintained at, a temperature above its melting point, for example, 5° C. to 50° C. above the melting point of the water-washed oxidized wax, as for example between 20° C. and 100° C., in order to liquefy the mixture and/or maintain it in a liquid condition. The water-washed oxidized wax is then mixed with between 1 and 10, preferably about 2 to 5, volumes of a hydrocarbon solvent per volume of water-washed oxidized wax.

The hydrocarbon solvent may be any hydrocarbon which does not react with the oxidized wax fraction and which can be evaporated from the oxidized wax at a temperature below the decomposition temperature of the components of the oxidized wax. In general, any saturated hydrocarbon, or mixture thereof, which boils over the range of about $-10°$ to $+150°$ C. may be used. Preferably, such petroleum-derived fractions such as butanes, pentanes, hexanes, heptanes, benzene, toluene, naphtha or light gasoline and the like will be used.

The hydrocarbon solvent-water-washed oxidized wax mixture is treated with a solution or slurry of sodium borate and water, which solution or slurry comprises about 4% to 50% by weight of sodium borate. The amount of sodium borate to be used is that amount which is stoichiometrically equivalent to about 90% to 95% of the naphtha-insoluble acids present in the hydrocarbon oxidate mixture. After contacting, the oxidized wax mixture with the sodium borate slurry, the borax and the desired naphtha-insoluble acids appear to be completely solubilized in the aqueous phase. Separation of the two liquid phases following the contacting yields an aqueous borate complex phase containing the desired acids solubilized therein by the borax and a hydrocarbon phase containing the naphtha-soluble acids and neutral constituents.

The solubility of the borax, i. e. sodium borate or sodium tetraborate-decahydrate, in water at room temperature is about 4% by weight and the solubility is increased with increase in temperature. The borax used in forming the complexes may consist of a partially saturated solution of borax, a saturated solution of borax or an aqueous slurry of borax. The presence of naphtha-insoluble acids in a sodium borate-water system markedly increases the solubility of the sodium borate and concentrations of as high as 50% by weight of sodium borate in water may be obtained even at room temperatures in the presence of the added acids.

The naphtha-soluble acids present in the wax oxidate are somewhat soluble in the borate complex phase and are taken up in this phase particularly when the amount of borate employed is greater than that required to extract the naphtha-insoluble acids desired to be separated. For this reason somewhat less than the theoretical quantity of borax is employed as indicated hereinabove. The preferred quantity of borax is between about 0.9 and 0.95 mol of borax for each 3 equivalents of acid to be extracted.

The extraction with aqueous borate is preferably carried out at temperatures between about 5° C. and 50° C. above the melting point of the oxidized wax and thus at temperatures between about 20° C. and 100° C. The extraction may be carried out at ordinary atmospheric pressures or at higher pressures such as up to about 10 atmospheres, the higher pressures permitting the use of higher temperatures, at which the rate of complex formation is more rapid.

In the alternative method of extraction with aqueous borate, the water-washed oxidized wax is heated to a temperature above its melting point, i. e. in the range of 20° C. to 90° C. and the liquid mixture contacted with aqueous borate solution or slurry having a sodium borate content of between about 4% and 50% by weight. The oxidized wax is thoroughly mixed with the borate solution or slurry for a time sufficient to insure complete reaction or complex formation and the resulting mixture permitted to settle. Rapid separation occurs and the lower aqueous phase is removed and separately extracted with a hydrocarbon solvent such as naphtha or the like in order to remove entrained hydrocarbon-soluble material. Preferably, following complex formation and before the liquid phases are separated, a hydrocarbon naphtha is added and agitation continued to effect solution of the naphtha-soluble materials present in the mixture. Following settling, the hydrocarbon phase is separated from the borate solution.

Extraction with borate solution and with hydrocarbon solvents as described hereabove may be carried out in a series of mixing and settling vessels or in ordinary extraction columns packed with suitable contact material such as rings, saddles or the like.

The success of the borax solvent extraction process employed in obtaining the borax soap complexes resides in the use of concentrated borax solution. For some reason, stable emulsions are not formed when aqueous borax solutions having more than about 4% by weight of borax are used. Solutions containing less than about 4% borax form very stable emulsions which are similar to those obtained when the separation of these acids is attempted with strongly alkaline solutions. It is for this reason that the limits of borax solution or slurry from about 5 to about 20 weight per cent or higher are preferred.

The hydrocarbon-insoluble aqueous soap-complex phase, which is separated during the extraction step, is heated to evaporate a small amount of dissolved hydrocarbon solvent. The solvent-free borate complex is then treated with a mineral acid to decompose the complex with the subsequent formation of a naphtha-insoluble acid phase. The resulting aqueous phase contains boric acid, any excess of mineral acid employed in the acidification step, and the metal salts of the mineral acid. The preferred acid for the acidification step is sulfuric acid and preferably sulfuric acid having a concentration of about 40% to 50% by weight; however, concentrations of 1% or less up to as high as 80% or even 100% in the case of sulfuric acid may be employed. Moreover, the mineral acids such as hydrochloric acid, phosphoric acid, nitric acid and the like may be used. The moderately concentrated acids are preferred because in subsequent purification operations less difficulty is encountered due to the excessive amounts of water or dilution which are present when more dilute acids are employed. The amount of acid required amounts to about 1 equivalent per equivalent of borax and is just sufficient to convert the borax present in the complex to boric acid. This amount will serve to decompose the soap complex completely and liberate the acids held therein. If desired, however, an excess of acid may be employed, in which case boric acid is salted out as a crystalline phase and may be separated by filtration, reconverted to its sodium tetraborate salt, and re-employed in the process. It has been found that by employing an excess of 2 mols of sulfuric acid per mole of borax and evaporating from the aqueous phase about 50% of the water present, an 80% by weight recovery of crystalline boric acid may be effected.

The naphtha-insoluble acid fraction formed by the acidification of the borate extract phase is water washed at a temperature between 30° C. and 100° C., preferably between 50° C. and 75° C. with sufficient water to remove small amounts of residual mineral acid and water-soluble inorganic salts present therein. The water-washed material comprises a relatively pure acid mixture which is substantially free from unoxidized wax or other neutral materials and from naphtha-soluble acids. This material, when neutralized with sodium hydroxide for example and extracted with ethyl ether, yields only about 3% of non-carboxylic material. This acid fraction is produced as a dark brown viscous liquid at room temperature and comprises compounds which have for the most part between about 6 and 50 carbon atoms per molecule. Analysis of esters prepared from this material indicates that the acids range in size from 10 to more than 30 carbon atoms, the major proportion of the acids having in the neighborhood of 20 carbon atoms per molecule. In this connection it is to be noted that the molecular size of the acids will depend, however, upon the molecular weight of the wax being oxidized. The greater proportion of the acids present will contain from about 10 to 30 or 40 carbon atoms per molecule.

The hydrocarbon phase which was separated from the borate extraction solution contains the hydrocarbon-soluble acids, unoxidized wax and neutral oxygenated materials. The separated hydrocarbon phase may be re-contacted with additional quantities of the aqueous borax solution in an amount which is slightly in excess of that which is equivalent to the 5% to 10% of the original naphtha-insoluble acids which remain in the hydrocarbon phase. As has been previously described, the amount of borax employed in the first borate extraction step was only equivalent to between 90% and 95% of the desired acids present therein. The purpose of the second extraction is to remove the residual portion of naphtha-insoluble acids. These acids are obtained in a less pure form, i. e. contaminated with naphtha-soluble acids and some neutrals. The second borate extract can be acidified with a mineral acid as described above to obtain the acids which may be added to water-washed wax oxidate prior to extraction, or, alternatively, the extract solution may be used as part of the borate extraction solution in the first borate extraction step. In this manner they are ultimately recovered in relatively pure form from the first-stage extract solution as described hereinbefore. The contaminating neutrals and fatty acids are rejected into the hydrocarbon phase in the first extraction step and ultimately recovered in the hydrocarbon phase from the second borate extraction step, relatively free from naphtha-insoluble acids.

The hydrocarbon phase from the second borate extraction step is contacted with a dilute aqueous alkaline extractant containing a basically reacting alkali metal compound such as a bicarbonate, carbonate or hydroxide of an alkali metal in a packed extraction column, or in a series of mixing and settling vessels. The alkaline extractant preferably contains between about 1% and 10% by weight of the basically reacting compound and the alkali metal carbonates such as sodium carbonate are preferred. Generally around 5% of sodium carbonate gives the best and most economical extraction. The extraction serves to form the alkali metal salts or soaps of the hydrocarbon-soluble acids thereby affording a means of separating these acids from the neutral materials, which are not extractable from the hydrocarbon phase under these conditions. Operational difficulties arising from the formation of stable emulsions are minimized by the use of dilute alkali metal salt solutions. If and when emulsions persist, alcohol may be added to the extraction or de-emulsifiers employed. The extracted hydrocarbon phase comprises a hydrocarbon solution of neutral bodies and the aqueous phase contains the water-soluble alkali metal salts of the naphtha-soluble acids.

The carbonate-extracted hydrocarbon phase is distilled to recover the hydrocarbon solvent which is recycled to the hydrocarbon solution and/or extraction step. The bottoms material from the distillation comprises the neutral constituents consisting of unoxidized wax and neutral oxygenated compounds present in the crude oxidized wax. The neutral compounds, if desired, may be recycled to the oxidation step wherein they may be oxidized together with fresh wax. Alternatively, the neutrals may be produced as a distinct and useful by-product.

The aqueous phase from the carbonate extraction is heated to remove a small amount of dissolved or entrained hydrocarbon and is then acidified with a strong mineral acid such as was described for the acidification of the borate extraction solution. The amount of mineral acid to be employed is that sufficient to convert the alkali metal soaps of the naphtha-soluble acids to the free acids and the alkali metal salts of the mineral acid. A slight excess of acid is desirable. The alkali metal soaps of the naphtha-soluble acids are thus decomposed and the free acids are liberated as an oily water-insoluble phase. The aqueous phase contains any excess acid employed in the acidification together with the alkali metal salt of the mineral acid. The naphtha-soluble acids liberated from their alkali metal salts are removed and washed with water to remove excess mineral acid and entrained inorganic salts, whereby a light-colored semi-solid mass of relatively pure naphtha-soluble fatty acids having between about 6 and 40 carbon atoms per molecule is obtained.

The borax extraction solution employed in the process according to our invention is preferably one containing sodium tetraborate decahydrate, also known as borax. However, other alkali metal tetraborates such as those of lithium, potassium, rubidium, and cesium are likewise applicable and give separations comparable to those of sodium. In certain cases, it may be possible to employ the borates of the alkaline earth metals such as calcium, barium and strontium. However, these latter salts are not the preferred borates and are difficult to employ because of their low water solubility.

The hydrocarbon-extracted aqueous borax soap solutions which have been previously described are ordinarily liquid at normal temperatures, that is, around room temperatures. They are non-alkaline, having a pH less than 7 and have the properties of an excellent wetting agent. These soap complexes may be modified in concentration by either the removal or addition of quantities of water so as to form emulsifying, solutizing, and gelling agents. The interesting characteristics and properties of these borate complexes is indicated by the following. Borax is soluble in water to the extent of about 3% at 25° C. The addition of 25 g. of naphtha-insoluble acids of this invention, however, so solubilizes the borax that 10 g. can be dissolved in 100 ml. of water at 25° C. With increasing amounts of acids, such as 50 g., as much as 50 g. of borax can be incorporated with 100 ml. of water. With these high percentages the system becomes a solid gel. The gel may be used directly as a detergent or it may be dispersed in water in various proportions to obtain liquid detergents.

Although the borax extraction and naphtha extraction processes described are the preferred methods for the separation of the desired naphtha-insoluble acid fraction from oxidized wax mixtures, other methods of separation disclosed hereinafter may also be used. For example, melted oxidized wax mixtures, of the types which are produced under the conditions described herein, appear to exist as two distinct intimately-dispersed liquid phases. This is particularly true of the oxidized wax before water washing. The separation of the two liquid phases during long standing in a melted state is incomplete and is of relatively little value. However, by centrifuging the melted oxidized wax, the two fractions can be separated. The denser phase contains the naphtha-insoluble acids together with most of the water-soluble lower molecular weight compounds, while the lighter phase contains the neutral oxygenated compounds, fatty acids and unreacted or unoxidized wax. Reasonably pure naphtha-insoluble acids may be obtained by water washing the melted denser phase to remove the water-soluble components therefrom. The centrifuging process may be improved by adding small amounts of a hydrocarbon solvent to the melted oxidized wax prior to centrifuging in order to decrease the density of the hydrocarbon-soluble phase and facilitate the phase separation during the centrifuging step. While the hydrocarbon solvent may be any paraffinic hydrocarbon which can be removed from the mixture by distillation, e. g., hexanes, heptanes, octanes, petroleum naphtha and the like, the use of paraffin wax itself is preferred because of its particular advantage that the paraffin-soluble phase may then be returned directly to the oxidizer for further oxidation. The solvent may be employed in any desired ratio and sharp separations are obtained when about 0.1 to 1.0 volume of solvent per volume of water-washed oxidized wax are employed.

The water-washed oxidized wax can also be separated into its respective components either by fractional solution in sulfuric acid or by fractional precipitation from sulfuric acid. In the former, the water-washed oxidized wax is repeatedly contacted with progressively increasing concentrations of sulfuric acid, starting with about 65% sulfuric acid and finally extracting with about 95% acid. Under these conditions, it is found that the residual water-soluble components are the most soluble and are dissolved in the 65% acid. The naphtha-insoluble acids of this invention appear to be soluble in the more concentrated acid and are dissolved by 70%–75% acid. The fatty acids are dissolved in acid of about 80% to 90% concentration while the neutral oxygenated materials and unreacted wax are substantially insoluble in 90% sulfuric acid. The neutral oxygenated compounds are incompletely soluble in about 95% sulfuric acid.

The described sulfuric acid fractionation process can also be reversed in which case the water-washed oxidized wax is contacted with about 90% to 95% sulfuric acid in order to dissolve all of the oxidized wax mixture with the exception of part of the neutral oxygenated compounds and the unreacted wax. The addition of small amounts of water to the sulfuric acid-containing solution of the oxidized wax components progressively precipitates the less soluble components present in the acid. The neutral oxygenated compounds, the fatty acids and then the naphtha-insoluble acids can be successively precipitated by dilution of the acid.

The water-washed oxidized wax can also be fractionated by partial solution in, or precipitation from, acetic acid in substantially the same manner as is employed for sulfuric acid.

The preferred method of separation using acetic acid employs water rejection or fractional precipitation wherein the major portion of the oxidized wax is first dissolved in concentrated or glacial acetic acid, and the oxidized wax fractions are separated therefrom by incremental addition of water. The acetic acid process has an additional advantage in that a better separation of neutral oxygenated compounds is obtained. The addition of the acetic acid to the oxidized wax dissolves all but unreacted paraffin wax which is substantially insoluble in concentrated acetic acid mixtures, while the oxygenated neutrals, fatty acids, and naphtha-insoluble acids are dissolved in the acetic acid. It is to be pointed out that the products obtained by the oxidation procedures outlined herein contain very small amounts of paraffin wax separable in this manner. Generally the amount is less than about 3% by weight. The latter solution is next diluted step-wise with small proportions of water sufficient to precipitate first only the neutral oxygenated compounds which are separated from the remaining acetic acid solution, then the fatty acids which are separated in turn, and finally the naphtha-insoluble acids which are separated from the dilute acetic acid by decantation.

Although acetic acid is the preferred acid for this purpose, other low molecular weight acids such as formic acid, propionic acid, butyric acid, isobutyric acid and the like may also be employed. Mixtures of these acids, such as are recovered from the condensed volatile material from the exit gas from the oxidation process itself, may also be employed.

Of the methods described above for the separation of the desired high molecular weight naphtha-insoluble acids, the borate method permits the separation of a fraction of highest purity. This fraction is relatively free of neutral oxygenated compounds which act as undesirable inert diluents in certain reactions such as esterification, polymerization and the like, to be described hereinafter.

Although the products from the borate refining method are very pure, it is apparent that substantially the same acids can be obtained in a less pure form from other methods of separation. It is also apparent that the reactions of these naphtha-insoluble acids are in themselves not dependent necessarily upon the method of separation and that only the quality of the products is involved in the choice of the method of refining. Thus, in the reactions to be described, water-insoluble, naphtha-insoluble acids isolated from oxidized wax by any suitable process may be used in the broad application of the reactions.

The character of the acid fraction referred to herein as the naphtha-insoluble water-insoluble fraction of wax oxidate is not fully understood and it is difficult to determine the exact nature of the acids present in this fraction. This is due primarily to the fact that the fraction contains acids of varying molecular weight and of varying chemical constitution. As indicated hereinabove the acids present in the fraction may vary from those containing 8 carbon atoms up to those containing as many as 50 or 60 carbon atoms per molecule. However, generally the average molecular weight of this fraction would indicate that the average carbon atom content is between about 20 and 30 per molecule. A typical naphtha-insoluble fraction, obtained by oxidizing a paraffin wax having a melting point of 63° C. to an acid number of 250 mg. KOH/g. and separating the naphtha-insoluble acids by extraction with a light gasoline fraction of petroleum, has an acid number of about 165 mg. KOH/g., a saponification number of about 345 mg. KOH/g. and contains an average of 1 atom of neutral oxygen per carboxyl group. By "neutral oxygen" is meant oxygen other than that present in carboxylic groupings. This so-called neutral oxygen may be in the form of carbonyl groups, hydroxyl groups or the like. The presence of esters in the naphtha-insoluble fraction is indicated by the fact that the saponification number is greater than the acid number. Apparently internal esterification occurs during oxidation, giving rise to lactones, lactides and the like. The esters present, whether lactones, lactides or the like, will be referred to herein as "inner esters." Regardless of the structure of the acids present in the naphtha-insoluble fraction prepared as indicated herein, this fraction is usable in the various reactions described hereinbelow and in the preparation of the various products described and applicants are not to be limited by any theories presented regarding the composition of this fraction, regarding the reactions to be described or the composition of the various products to be described.

The presence of esters in the naphtha-insoluble fraction is not objectionable for most of the purposes described herein. However, it is possible to hydrolyze these esters and produce a naphtha-insoluble fraction having a saponification number to acid number ratio of about 1.2 to 1 without producing other chemical changes in the acid fraction to any appreciable extent. The hydrolysis of the esters is preferably carried out at a temperature in the range of 50° C. to 150° C. and will usually take place most readily without causing other reactions to take place at temperatures between 75° C. and 125° C. At lower temperatures the reaction is slow and does not proceed to completion within a reasonable period of time. At temperatures above those specified the reaction is rapid but it is accompanied by side reaction, leading to the formation of undesirable product. Pressure may be employed and is found to increase the rate of de-esterification without leading to the production of undesirable products. Pressures in the range of normal atmospheric pressure to about 15 atmospheres pressure are satisfactorily employed. Preferably, the hydrolysis of the esters is carried out in the presence of a low molecular weight solvent such as methyl alcohol, ethyl alcohol, isopropyl alcohol, acetone, dioxane, ethylene glycol and the like. The use of solvents appears to increase the rate of hydrolysis.

The esters may also be removed by saponification. In this process any strong alkali may be used which does not form insoluble precipitates with materials present in the naphtha-insoluble fraction. Suitable alkalis include the alkali metal hydroxides of which the sodium and potassium hydroxides are the preferred saponification or hydrolysis agents. The amount of alkali employed may vary from the amount of which is stoichiometrically equivalent to the combined acids and esters present in the mixture up to about seven times the equivalent amount. Generally, between 1.5 and 3 times the theoretical equivalent amount of alkali will be employed.

Following treatment with alkali, the mass is acidified in order to release the free acids and this is the critical step in the production of an acid fraction relatively free from esters, i. e. an acid fraction having an acid number substantially the same as its saponification number. Since strong mineral acids tend to catalyze the formation of inner esters, it is desirable that in acidifying the saponified naphtha-insoluble acid mixture a dilute mineral acid solution is employed and in adding the dilute acid care must be exercised to prevent a local excess of mineral acid, i. e. good agitation should be employed and preferably the soaps obtained in the saponification reaction are diluted with 3 or 4 volumes of water or alcohol before adding the diluted mineral acid. Moreover, it is desirable that the temperature be maintained between about 20° C. and 50° C. during the neutralization. For example, the naphtha-insoluble acids have a marked tendency to form inner or intra esters with the result that the saponification number-acid number ratio is about 1.7. This ratio can be increased to 2.0 by simply heating the acid fraction and can be effected more rapidly by heating in the presence of a small amount of mineral acid as catalyst. Following saponification of the naphtha-insoluble acids and decomposition of the soaps with mineral acids, it is found that the ratio of saponification number to acid number is about 1.4, unless special precautions are taken to prevent the formation of inner esters. It is possible to obtain an acid product having a lower ratio by using dilute acids in the acidification step and relatively low temperatures. In such cases it has been found possible to obtain acids having a saponification number-acid number ratio of 1.2, or even 1.15. In producing alcohol esters we prefer to conduct the neutralization under the last named conditions in the presence of an excess of alcohol to fix the carboxyl groups before lactonization or other inner ester formation occurs.

When the objective is to recover free acids, sufficient aqueous mineral acid is employed to release all of the organic acids present in the mixture and, following the release of these acids, the mixture is permitted to settle and stratify; the top layer consisting of naphtha-insoluble acids substantially free from esters is separated from the lower acidic aqueous phase. Following its separation the naphtha-insoluble acid phase is water washed and dried. These acids, when thoroughly dried, are rendered quite stable with respect to reversion to their partially esterified form and as such may be stored for periods of several months without appreciable change. However, the presence of traces of mineral acid and moisture will cause partial reversion in storage.

The acid fraction, following saponification, is generally contaminated with from 5% to 10% by weight of dissolved and/or entrained water. The removal of this water without causing loss or chemical change is difficult, and thorough water washing is necessary. Complete removal is most readily effected by distillation, which may be carried on at reduced pressure in order to reduce temperatures required and will preferably be carried out in the presence of an inert non-polar solvent which acts as an entrainer for the water. Suitable solvent entrainers for this process include those petroleum fractions whose boiling points, at atmospheric pressure, is between 30° C. and 120° C. and include all of the lower paraffinic, naphthenic and aromatic hydrocarbons, as for example, pentane, hexane, octane, benzene, toluene, cyclohexane, methyl cyclohexane, straight run petroleum fractions and naphthas from gasoline and the like. Following distillation with the entrainer, the distillate is cooled, the water separated and the solvent returned to the distillation step. Benzene is a particularly useful entrainer since with its use there is no evidence of increase in saponification value. On the other hand, it appears that xylene not only produces some inner esterification but causes a certain amount of dehydroxylation, as evidenced by the fact that water is produced in excess of that resulting from the esterification. Where dehydroxylation is desired the use of xylene and like-boiling solvents is indicated. This is discussed hereinbelow.

DERIVATIVES OF NAPHTHA-INSOLUBLE WAX ACIDS

In preparing useful derivatives and/or reaction products of the naphtha-insoluble acids of this invention, the acids as recovered following borate extraction, naphtha extraction, or the like, may be directly employed or these acids may be saponified and reacidified as indicated to reduce the inner ester content of the acid mixture and the resulting acid fraction employed or, depending upon the desired products, the naphtha-insoluble acid fraction, before or after saponification to eliminate esters, may be treated to produce unsaturation in at least some of the molecules to give an acid mixture containing unsaturated acids. This latter material containing unsaturated high molecular naphtha-insoluble acids may be used in the various reactions and in the preparation of the various derivatives described herein, particularly where polymerization characteristics or polymerized products are desired.

UNSATURATED NAPHTHA-INSOLUBLE ACIDS

In treating the naphtha-insoluble fraction or saponified fraction to produce unsaturated acids, naphtha-insoluble acids are dissolved in a hydrocarbon solvent entrainer, as for example pentane, hexane, heptane, octane, benzene, toluene, xylene, petroleum naphtha and the like, and the mixture distilled, the distillation being continued until no further water is obtained in the distillate. Of the entrainers mentioned the aromatic hydrocarbons are preferred since they are solvents for the naphtha-insoluble acids and, by reason of solution of the acids, effect a dilution retarding the tendency of the unsaturated acids formed to polymerize during the heat treatment. Although unsaturated acids may be produced by this treatment without the use of catalysts, it is desirable to employ catalytic agents and, in the presence of catalysts, temperatures between about 100° C. and 150° C. may be employed. Temperatures between 115° C. and 135° C. have been found to be particularly desirable in that the reaction proceeds at a reasonable rate and does not lead to the formation of large amounts of polymeric materials. The catalysts to be employed include such acid catalysts as benzene sulfonic acid, toluene sulfonic acid, sulfuric acid, chlorosulfonic acid, boric acid, phosphoric acid and the like. Using these catalysts and employing temperatures in the range of 100° C. to 150° C. with a hydrocarbon entrainer to aid in the removal of water formed in the treatment requires between about 15 and 60 hours. Apparently, because of the removal of hydroxyl groups during such heat treatment, the saponification number of the acids does not appreciably increase during the reaction to form unsaturated acids, even though the conditions employed are conditions normally conducive to the production of internal esters.

In carrying out the preparation of unsaturated acids in the absence of catalytic agents, the naphtha-insoluble acids are mixed with 0.1 to 10 volumes of a hydrocarbon entrainer and the mixture refluxed at a temperature of 150° C. to 200° C. Preferably the temperature is maintained in the range of 150° C. to 185° C. The refluxing of the mixture is continued until the desired degree of unsaturation is produced as indicated by the amount of water separated from the overhead distillate, or until the reaction has been completed as indicated by the lack of formation of water in the final stages of refluxing. Such thermal non-catalytic reactions, even though effected at somewhat higher temperatures than the catalytic reactions, require as much or more time to obtain the desired degree of unsaturation as the catalytic reactions.

A comparison of catalyzed and uncatalyzed dehydroxylation operations may be illustrated using data from gasoline-insoluble studies. The entrainers were toluene and xylene. Refluxing the acids with entrainer only for 20 hours, toluene produced only a trace of water whereas xylene produced 24% of the theoretical amount of water. Refluxing with entrainer and dehydroxylation catalyst, it was found that with toluene 67% of the theoretical amount of water was produced and with xylene 89% of the theoretical amount of water was produced after 20 hours refluxing.

ESTERS OF NAPHTHA-INSOLUBLE ACIDS

The naphtha-insoluble acids, the saponified and re-acidified naphtha-insoluble acids or the unsaturated naphtha-insoluble acids prepared as indicated hereinabove may be esterified with mono or polyfunctional alcohols to produce ester materials having interesting and useful properties. The monohydroxy alcohol esters are particularly useful as resin or plastic modifiers or plasticizers. The polyfunctional alcohol esters are also useful as plasticizing agents in the preparation of synthetic resins. Moreover, these materials are useful per se as synthetic drying oils, as copolymerization agents to be used with various polymerizable materials in the preparation of synthetic resins or plastics and, depending upon their method of preparation, interesting plastic and resin-like materials are obtainable merely by the polymerization of the polyfunctional alcohol esters of the unsaturated acid fractions mentioned.

Alcohols to be used in the preparation of the esters include the monohydroxy aliphatic alcohols such as methyl alcohol, ethyl alcohol, propyl alcohol, isopropyl alcohol, the butyl alcohols and the higher molecular weight homologs of these alcohols up to and including stearyl alcohol and the like; the naphthenic alcohols such as cyclopentyl alcohol, cyclohexyl alcohol, methyl cyclopentyl and methyl cyclohexyl alcohols, and the higher monologs of these alcohols which contain either larger substituents in the $C_5$ of $C_6$ rings, or which contain more than one aliphatic substituents in the ring; the aryl substituted aliphatic alcohols, as for example benzyl alcohol and the like, as well as the polyfunctional alcohols including glycol, glycerol, sorbitol, erythritol, pentaerythritol, dipentaerythritol and the like.

In preparing esters the naphtha-insoluble acid fraction is heated with an alcohol to a temperature in the range of about 50° C. to about 200° C., depending upon the particular alcohol employed, upon whether or not it is desired to cause dehydroxylation and upon the presence or absence of catalysts. If dehydroxylation is to be avoided, the temperature of esterification will be between about 50° C. and about 135° C. If catalytic agents are employed, generally an upper temperature of 100° C. is desirable and the preferred range is between 60° C. and 90° C. if dehydroxylation is to be avoided. If the esterification is to be effected in the absence of catalytic agents then temperatures in the range of 115° C. to 135° C. will give substantially complete esterification without dehydroxylation.

If dehydroxylation is to be effected along with esterification then temperatures in the range of 150° C. to 200° C. will be employed in the absence of catalysts and in the range of 90° C. or 100° C. to 150° C. if catalytic agents are used. In the latter case the preferable range is 115° C. to 135° C.

Esterification is preferably carried out in the presence of a hydrocarbon entrainer which serves to remove water produced in the esterification reaction. An entrainer is selected which will permit the reaction to take place within the temperature range indicated above to be desirable in any particular case. Preferably the entrainer will be an aromatic hydrocarbon such as benzene, toluene, xylene, cumene and the like in which the naphtha-insoluble acid fraction is soluble. The amount of entrainer which serves also as a diluent will be between 0.1 part and 10 parts per part of naphtha-insoluble acid fraction. The total reaction mixture, including the entrainer, is refluxed and water removed from the reflux system by means of a water trap. The extent of esterification can be determined by following the change in the acid number of the reaction mixture or by determining the amount of water recovered from the system, or both. The use of both methods gives an indication of the amount of dehydroxylation occurring along with esterification. In case complete dehydroxylation is desired, heating is continued until no further water is produced.

The amount of alcohol to be employed will be between about 0.5 and 5 equivalents per equivalent of acid, depending upon the alcohol employed and upon the character of the ester product desired. Thus, in preparing monohydroxy alcohol esters of naphtha-insoluble acids it is highly desirable to employ an excess of the alcohol in order to obtain rapid and complete esterification. In such cases at least 1.5 mols (equivalents) of alcohol will be employed per equivalent of acid and in case it is desired to produce esters of the acids present in a naphtha-insoluble acid fraction which has been saponified and re-acidified to reduce the inner ester content and it is further desired to maintain the inner ester content at a low value, generally 2 or more equivalents of alcohol will be employed per equivalent of acid. Following esterification the excess alcohol may be removed from the ester by distillation, or in the case of high boiling alcohols, by solvent extraction, as would be apparent to one skilled in the art.

In preparing esters with polyfunctional alcohols, lower alcohol to acid ratios are employed since, in this case, it is generally desirable to esterify all of the hydroxyl groups of the polyhydroxy alcohol. In such cases the ratio of equivalents of alcohol to equivalents of acid will be preferably in the range of 0.5 to 0.8, although where the presence of free hydroxyl groups on the alcohol following esterification is not objectionable the amount of polyhydroxy alcohol employed may be equivalent to the acid, or even somewhat greater. It is observed that esterification of a naphtha-insoluble acid fraction with .7 or .8 equivalent of a polyfunctional alcohol will result in the production of a completely esterified product. Apparently inner esterification proceeds to some extent in such cases.

Unsaturated esters may be produced by either of two procedures. The naphtha-insoluble fraction may first be dehydroxylated as described above and subsequently esterified, or esterification and dehydroxylation may be carried out simultaneously providing an entrainer is selected which has a boiling point high enough to permit a refluxing temperature in the range of about 100° C. to about 150° C. with a catalyst, or about 140° C. to about 200° C. in the absence of a catalyst. Thus, if toluene is used as the entrainer along with one of the catalysts described herebelow, as for example benzene sulfonic acid, it is possible to effect dehydroxylation along with ester formation. If xylene is employed as the entrainer it is possible to obtain simultaneous esterification and dehydroxylation without the use of a catalyst, although even in this case the reaction rates are improved by employing catalytic agents. Cumene and higher boiling aromatic hydrocarbons may be used without catalytic agents to give relatively high rates of esterification and dehydroxylation.

Catalysts which may be employed in all of the above esterification and dehydroxylation reactions include benzene sulfonic acid, toluene sulfonic acid, sulfuric acid, chlorosulfonic acid, boric acid, phosphoric acid and the like.

In carrying out the esterification reactions, and particularly where conditions are employed to produce simultaneous dehydroxylation, a certain amount of polymerization occurs, and if temperatures in the high end of the ranges indicated as being useful are employed the product may, in some cases, be gelled or at least partially gelled before the completion of the desired esterification and dehydroxylation reactions. Gelation effectively prevents further reaction and renders the product insoluble in such solvents as toluene, xylene and the like. Apparently crosslinked polymers are formed, polymerization taking place at the double bonds created in the molecules by dehydroxylation.

Gelation during esterification and/or dehydroxylation may be avoided or at least the tendency toward gelation reduced by effecting the esterification and/or dehydroxylation reactions in the presence of certain added compounds which will be referred to herein as "non-gelation agents." These agents appear to have more than one function when employed in these reactions, i. e. they act not only as non-gelation agents but, depending upon the type of non-gelation agent employed, they may be coesterified along with the naphtha-insoluble acids or they may be copolymerized with the unsaturated acids or esters present in the reaction mixture to form modified polymerization products. Such non-gelation agents include organic acids having a conjugated diene grouping, which group of compounds includes linoleic acid, linolenic acid, acrylic acid, methacrylic acid, abietic acid, and particularly rosin, which contains abietic acid. Non-acidic agents include turpentine, styrene, alphamethyl styrene, isoprene, butadiene, pentadiene, cyclopentadiene; esters of the acids mentioned above such as the methyl, ethyl etc. esters of linoleic acid, linolenic acid, abietic acid, acrylic acid, methacrylic acid, acrylonitrile and the like.

Where the desired effect of the non-gelation agent is that of preventing gelation only and coesterification or copolymerization is not desired, relatively small proportions of these materials suffice. Thus, between about 0.05 and 0.5 mol, and preferably between about 0.1 and 0.3 mol of non-gelation agent will be employed per equivalent of naphtha-insoluble acid. Where it is desired to produce modified esters of dehydroxylated naphtha-insoluble acids, non-gelation agents may be employed in larger amounts. Desirable products have been obtained in which 0.5 to 20 mols of non-gelation agents per equivalent of naphtha-insoluble acids have been employed. In such cases gelation does not occur and the dehydroxylation and esterification reaction can be carried to substantial completion. In such utilizations it is necessary to employ an amount of alcohol sufficient to react with all of the acid groups of the added non-gelation agent in order to obtain a substantially completely esterified product.

In all of the foregoing reactions in which nongelation agents are employed abietic acid and/or a substance containing abietic acid, such as rosin, and also styrene are the preferred non-gelation agents, whether used in amounts to merely inhibit gelation or in greater amounts to both inhibit gelation and modify the resulting esters. We have found further that in certain instances it is desirable to use two types of non-gelation agents. Thus, when using rosin the addition of 0.1 part to 2 parts by weight of turpentine, based on the rosin, appears to enhance both the esterification and dehydroxylation reactions and permits the reactions to take place at lower temperatures for a given degree of esterification. The resulting products have greater solubility in hydrocarbon solvents and are apparently less highly polymerized at the completion of the desired reactions.

It will be apparent that in any of the above esterification and/or dehydroxylation reactions it is possible to stop the reaction before completion to obtain products which, for example, will consist of (1) mixtures of saturated and unsaturated (dehydroxylated) naphtha-insoluble acids, (2) mixtures of saturated and unsaturated esters of naphtha-insoluble acids, (3) mixtures of naphtha-insoluble acids and esters of naphtha-insoluble acids and (4) mixtures of esters of polyfunctional alcohols wherein the polyfunctional alcohols may be completely esterified or only partially esterified and therefore have free hyodroxyl groups. Thus, it is possible to obtain a series of products having graded properties, both physical and chemical, which are useful as plasticizing agents for various synthetic resins and plastic mixtures, which are useful in linoleum compositions and the like and as drying oil substitutes or drying oil modifiers. Moreover, the unsaturated acids and esters produced by dehydroxylation which are capable of polymerization through their double bonds may be polymerized to form compounds of a resinous nature. Furthermore, because of their unsaturation they may be employed as polymerization modifiers or copolymerization agents useful in the preparation of modified synthetic resins and the like.

POLYMERIZATION PRODUCTS OF UNSATURATED ACIDS AND/OR ESTERS

The polymerization of the unsaturated acids and/or esters may be effected thermally in the absence of catalysts at temperatures of about 250° C. to 350° C. and such polymerization may be effected in the presence of solvents, as for example aromatic hydrocarbons such as benzene, toluene, xylene, cumene and the like. Preferably polymerization of these materials is effected in the presence of catalysts although thermal, non-catalytic polymerization at temperatures of 250° C. to 300° C. or even 350° C. may be employed. Active catalysts for such polymerization reactions and for copolymerization of the unsaturated acids and esters of this invention with other polymerizable materials include organic peroxides such as benzoyl peroxide, cumene peroxide and naphthene peroxides, particularly the naphthene hydroperoxides and the like. Other catalysts include manganese and cobalt soaps of carboxylic acid. Amounts of catalyst below 0.1% and 5% by weight of the reaction mixture appear to give satisfactory results and such reactions carried out in the presence of catalysts take place readily at temperatures between about 75° C. and 255° C. Where copolymerization with other polymerizable materials is desired such other polymerizable materials may include styrene, butadiene, acrylonitrile, methyl acrylate, methyl methacrylate, acrylic acid and related materials.

Particularly valuable synthetic resins of the modified alkyd type are produced by simultaneous esterification and dehydroxylation or esterification followed by dehydroxylation of the naphtha-insoluble acids and polyfunctional alcohols in the presence of polyfunctional acids or polyfunctional acid anhydrides which are also simultaneously esterified. The esterification-dehydroxylation reaction may be carried out in the manner and under the conditions of temperature, water removal, etc. previously described for the esterification-dehydroxylation of the naphtha-insoluble acids with polyfunctional alcohols except that the polyfunctional acids are included in the reaction mixture. Products obtained in this manner are found to have drying properties similar to those of the alkyds modified with drying oil acids, such as those derived from linseed or tung oil. Moreover, these products are more tacky, more resilient, and less brittle than the conventional alkyd resins. Suitable polyfunctional acids for the preparation of modified alkyd resins include phthalic acid, maleic acid, adipic acid, succinic acid, and the like as well as the anhydrides of these acids. Suitable polyfunctional alcohols for the preparation of the modified alkyd resins include glycerol, pentaerythritol, sorbitol and the like. The amount of naphtha-insoluble acid fraction to be used in preparing the modified alkyd resins should be such that the ratio of carboxyl groups of the naphtha-insoluble acids to carboxyl groups of the dicarboxylic acid is between about 0.05 and 0.5 to 1. Depending upon the molecular weight of the dicarboxylic acid and the naphtha-insoluble acid employed, the amount of naphtha-insoluble acid fraction will generally be between about .05 and .5 part per part of dicarboxylic acid or anhydride.

The esterification reaction to produce the modified alkyd resins may be carried out either catalytically or non-catalytically and is preferably conducted in the presence of an entrainer to remove water formed during the reaction and to control the temperature of the reaction. The amount of entrainer to be employed is preferably between 0.05 and 2 volumes per volume of reactants. Suitable entrainers include the aromatic compounds such as benzene, toluene, xylene, cumene, acetylene, petroleum-derived aromatic-rich fractions, coal tar fractions and the like.

Suitable reaction conditions for the preparation of modified alkyl resins are temperatures in the range of 140 to 200° C. Under these conditions, gelation of the reaction mixture is generally attained in 1.5 to 25 hours, depending upon the reactivity of the alcohol and the acids, the temperature employed, and the amount of solvent present. The gelled product is usually about 50 to 75 per cent esterified. The extent of simultaneous dehydroxylation reaction of the naphtha-insoluble acids is generally in the range of 10 to 40 per cent. The partially esterified, partially dehydroxylated, resinous gel is useful in the preparation of certain cementing compositions. However, the gel may be heated to still higher temperatures, such as in the range of 200° to 300° C., under which conditions the esterification reaction and dehydroxylation are mostly completed and some further polymerization of the unsaturated linkages also takes place. A tough resilient non-brittle polymer is thereby obtained which is superior to the alkyd resins modified by drying oil acids and the like, for many uses.

In the preparation of modified alkyd resins employing naphtha-insoluble acid fractions other organic acids may be employed as co-modifiers. Co-modifiers which may be used include abietic acid and the class of compounds disclosed hereinabove as non-gelation agents. Rosin or abietic acid has the particular desirable property of increasing the dehydroxylation and/or esterification of the resin and at the same time increasing the time required for gelation to set in. The use of rosin also permits the preparation of modified resins which, although of high molecular weight, tend to be more hydrocarbon-soluble than those resins which do not include rosin. The non-gelation agent, particularly rosin, is conveniently employed in amounts ranging from 0.05 to 20 mols of rosin per equivalent of naphtha-insoluble acids. The conditions for the preparation of modified resins incorporating both rosin and naphtha-insoluble acids are substantially the same as those which have been previously described for the preparation of modified alkyd resins incorporating only naphtha-insoluble acids.

The following examples will serve to illustrate further our invention but are not to be taken as in any way limiting the broader aspects of the invention.

EXAMPLE I

About 8600 parts by weight of a refined petroleum wax having a melting point of 145° F. were introduced into an oxidation vessel provided with heating and cooling coils and with means for introducing and dispersing air at a point near the bottom of the vessel. The wax was heated to about 130° C. at a pressure of 100 p. s. i. gage. Air was introduced into the oxidation vessel at a rate of 5.5 cu. ft./barrel/minute. After about 20 hours the oxidation reaction had begun to progress satisfactorily and the temperature was decreased to about 125° C. and the temperature was maintained at this point during the remainder of the reaction. Air blowing was continued until the acid number of the wax being oxidized was 265 mg. KOH/g.

The product was removed from the oxidation vessel and found to have a saponification number of 485 and a saponification number-acid number ratio of 1.8.

The product, amounting to 9000 parts by weight, was washed with two 10-volume portions of hot water to remove water-soluble constituents. After settling and removal of the aqueous phase there remained 5800 parts by weight of water-insoluble wax oxidate having an acid number of 160 and a saponification number of 300. The saponification number-acid number ratio was 1.85. This product comprises the acids of this invention and is useful in the various reactions and for the production of the various products described herein. This particular product will be referred to hereinafter as product A.

About 4000 parts by weight of product A was extracted with two 12,000 parts of a light petroleum naphtha having a boiling range of 50° C. to 85° C. After separation of the naphtha phase the insoluble phase was heated to 120° C. to evaporate the dissolved naphtha. The resulting naphtha-insoluble fraction amounted to 2620 parts by weight, corresponding to a yield of 66% based on product A (water-washed wax oxidate). This fraction had an acid number of 169, a saponification number of 345 and a saponification number-acid number ratio of 1.75. This product will be referred to hereinafter as product B.

A small portion of product B was analyzed for neutral, i. e. non-acidic, constituents in the following manner. About 100 parts by weight of product B was dissolved in 1000 parts by weight of peroxide-free diethyl ether. This solution was then extracted four times with 50 parts by weight of a 10% solution of sodium carbonate in water. The extracted ether solution was dried and the ether removed by distillation. The distillation residue consisting of neutral materials extracted from product B amounted to about 6 parts by weight or 3.7% by weight of the original sample (product A). This material was substantially acid-free.

The carbonate extract was carefully acidified with sulfuric acid using sufficient acid to convert all of the soaps to acids. The acidified extract was then extracted three times with equal volumes of peroxide-free diethyl ether to extract the liberated acids and the combined extracts evaporated to remove the ether. The resulting acids had an acid number of 230, a saponification number of 343 and contained substantially no neutral material.

About 1000 parts by weight of product A was subjected to borax extraction as described herein. This amount of the water-washed wax oxidate was mixed with 1650 parts by weight of an aqueous solution of sodium borate containing 9.1% by weight of the borax. The mixture thus formed was extracted three times with 1500 parts by weight of a petroleum naphtha at a temperature of 70° C. and the resulting hydrocarbon and aqueous phases separated. The aqueous phase containing the borate complex was heated to 95° C. to evaporate naphtha dissolved in it and then acidified with 69.5 parts by weight of 42% sulfuric acid. The acid was added slowly with agitation to prevent local over-heating. The separated acid fraction was water washed to remove inorganic salts and acids.

The naphtha phase obtained in the above extraction step was further extracted with 192 parts by weight of a 13% by weight solution of sodium borate in water at a temperature of 70° C. in order to remove small amounts of acids capable of forming borate complexes which were retained in the naphtha during the original extraction. The aqueous borate complex phase was separated, acidified and water washed as above to obtain additional acids. These acids were combined with the acids obtained in the initial borax extraction step and the combined products will be referred to hereinafter as product C. This product has an acid number of 195, a saponification number of 320 and a saponification number-acid number ratio of 1.7, and amounts to 50% by weight of the original product A. Extraction of this fraction with light petroleum naphtha fails to dissolve any acidic material, showing that acids separated in this manner are naphtha-insoluble.

The hydrocarbon or naphtha phase, following extraction with borax solution, was extracted three times with equal parts by weight of a 5% aqueous sodium carbonate solution. The aqueous extract containing sodium salts of naphtha-soluble acids was heated to about 95° C. to remove residual naphtha and then acidified with sufficient sulfuric acid to liberate acids contained in the soap solution. Naphtha-soluble acids obtained in this manner were water washed to remove inorganic salts and acids. These acids, which are primarily fatty acids, have an acid number of 160 and a saponification number of 226.

Neutral materials originally present in product A were obtained by evaporating the naphtha solution following extraction with borax and with sodium carbonate. Neutral material recovered in this manner amounted to about 12% by weight of product A.

EXAMPLE II

A fraction of naphtha-insoluble acids relatively free from inner esters was prepared as follows. About 400 parts by weight of product B from Example I, 152 parts by weight of potassium hydroxide dissolved in an equal weight of water and 160 parts by weight of ethyl alcohol were introduced into a flask fitted with a gas trap and the mixture heated and stirred at 90° C. for approximately 4.5 hours. At the end of this time no volatile gases had been evolved. The saponified mixture was diluted with 2000 parts by weight of water and acidified to a pH of 3 using 10% aqueous sulfuric acid. During the acidification the solution was vigorously agitated and the acid was added slowly in such a way that the contact of liberated acids with mineral acid was minimized. The acidified mixture was allowed to stratify and the liberated acids decanted and water washed. The product amounted to about 90% by weight, based on the original product B, and had an acid number of 205, a saponification number of 262 and a saponification number-acid number ratio of 1.28.

EXAMPLE III

A sample of naphtha-insoluble acids was self-esterified to produce a fraction having a high saponification number-acid number ratio, i. e. containing a high proportion of inner esters. In this case about 50 parts by weight of product B from Example I and 45 parts by weight of refined xylenes were placed in a flask fitted with a reflux condenser and a water trap. The mixture was refluxed for about 19 hours at a temperature of approximately 150° C. During the refluxing, water which separated in the water trap was measured to determine the extent of esterification. Approximately 1.7 parts by weight of water were collected and the product resulting from this treatment, following removal of xylene, had a saponification number of 140, an acid number of 276 and a saponification number-acid number ratio of 2.0.

EXAMPLE IV

Example III was repeated using 500 parts of product B and using 450 parts of benzene in place of xylene so that the temperature of the flask contents were maintained at about 100° C. After 19 hours of refluxing only 1.0 part of water had been collected, indicating that only a slight amount of esterification occurred.

Following this treatment 15 grams of benzene sulfonic acid was added to the flask contents and refluxing continued for an additional 3.5 hours. During this refluxing 19 grams of water were collected and the product had a saponification number of 138, an acid number of 280 and a saponification number-acid number ratio of 2.0. During this treatment some dehydroxylation occurred, as indicated by the presence of unsaturated groupings. The amount of dehydroxylation was estimated to be approximately 10 mol per cent.

In order to remove the catalyst the reaction product was treated with 6 molar sodium carbonate in an amount sufficient to just neutralize all of the benzene sulfonic acid present. The resulting mixture was washed four times with about 3 volumes of water per volume of mixture. The mixture was then evaporated to remove solvent and the final product was a brown, viscous oily liquid. This product will be referred to as product D.

EXAMPLE V

An ester of naphtha-insoluble acids was prepared by refluxing a mixture of 100 parts by weight of product B of Example I, 45 parts by weight of xylene and a 10% excess of the theoretical amount of lauryl alcohol. The mixture was refluxed for 100 hours, maintaining a temperature of about 150° C. in the liquid being refluxed. During the refluxing a water trap in the reflux line removed water produced during the esterification. The product was distilled to remove xylene and was found to be substantially completely esterified with respect to the carboxyl groups indicated by the acid number. This product has an acid number of 4 and a saponification number of 132, and will be referred to as product E.

EXAMPLE VI

Example V was repeated using sorbitol in place of lauryl alcohol. The refluxing was carried out at a somewhat higher temperature, i. e. about 180° C., for 7 hours. At this time approximately 40 mol per cent of dehydroxylation had occurred and somewhat more than one-half of the free hydroxyl groups of sorbitol had been esterified. Xylene was removed from the product by distillation and the esterified, partially dehydroxylated product was a reddish-brown, tacky, elastic material insoluble in aromatic solvents, turpentine, alcohol and the like.

EXAMPLE VII

Example V was repeated using glycerol in place of lauryl alcohol. In this case the mixture was refluxed for 11 hours at about 160° F. Following this treatment approximately 7 mol per cent esterification of the hydroxyl groups present in the glycerol had occurred and dehydroxylation amounted to approximately 21 mol per cent. After removal of solvent the resulting ester was a semi-solid, reddish-brown, tacky material.

EXAMPLE VIII

About 100 parts by weight of product D from Example IV, a self-esterified naphtha-insoluble acid fraction, was mixed with approximately 45 parts by weight of refined xylenes and about 15 parts by weight of glycol. The mixture was refluxed with a water trap in the reflux line for about 12 hours by maintaining the flask contents at about 150° C. The product, following removal of the xylenes, was a reddish-brown, viscous liquid soluble in the common solvents. This product appeared to contain about 15 mol per cent of dehydroxylated materials and approximately 70 mol per cent of the hydroxyl groups present in the glycol were esterified.

EXAMPLE IX

Example VIII was repeated using benzene in place of xylenes as the solvent together with 5 parts by weight of benzene sulfonic acid as catalyst. The product, after refluxing for about 2 hours at 100° C., was similar to that obtained in Example VIII.

EXAMPLE X

About 100 parts by weight of product D from Example IV, 45 parts by weight of benzene, 5 parts by weight of benzene sulfonic acid and 10 parts by weight of sorbitol were refluxed at a temperature of approximately 100° C. for 6 hours. The product, after removal of solvent and catalyst, was a tacky, semi-solid ester product. Titration data indicated that esterification was approximately 80% complete.

EXAMPLE XI

Approximately 100 parts by weight of product D, 45 parts by weight of benzene and 5 parts by weight of benzene sulfonic acid were placed in a flask and maintained at a temperature near the boiling point of the mixture (about 100° C.). Vaporous ethyl alcohol obtained by boiling anhydrous alcohol was passed through a small glass superheating zone in order to raise its temperature to about 110° C. and th esuperheated alcohol vapor introduced in the mixture contained in the flask. Alcohol vapor was allowed to distill from the reaction flask along with the water formed in the reaction and part of the benzene. At the end of about 5 hours the reaction product was found to be completely esterified and thus consisted of the ethyl ester of naphtha-insoluble acids. After removal of catalyst as described in Example IV and evaporation of benzene the product was a reddish-brown mobile liquid. This product will be referred to as product F.

EXAMPLE XII

Example XI was repeated using vaporous anhydrous methanol in place of the ethanol. The reaction proceeded in substantially the same manner and with the same results Complete esterification occurred within about 5 hours and the product, consisting of the methyl ester of naphtha-insoluble acids, was a reddish brown liquid.

EXAMPLE XIII

About 100 parts by weight of product F, the ethyl ester of naphtha-insoluble acids, and 45 parts by weight of a narrow boiling range straight-run hydrocarbon fraction from gasoline was refluxed at a temperature of about 200° C. for 30 hours. The water collected during the refluxing showed that about 70 mol percent of the ethyl ester had been dehydroxylated. After removal of the hydrocarbon fraction used as solvent by evaporation in vacuum, the product was found to be a reddish-brown viscous oil.

EXAMPLE XIV

About 100 parts by weight of product F, 45 parts by weight of refined xylenes and 5 parts by weight of benzene sulfonic acid were placed in a flask and refluxed with a water trap in the reflux line at a temperature of about 150° C. for 30 hours. The amount of water collected in the trap showed that the dehydroxylation of the ethyl ester was substantially complete. After removal of solvent and catalyst the product was a reddish-brown viscous oil having a somewhat darker color than that obtained in Example XIII.

EXAMPLE XV

About 100 parts by weight of product E, the lauryl ester of naphtha-insoluble acids, about 45 parts by weight of refined xylenes and about 5 parts of benzene sulfonic acid were placed in a flask fitted with a reflux condenser and a water trap. The mixture was refluxed at a temperature of about 150° C. for about 30 hours. The amount of water collected in the water trap showed that dehydroxylation in the lauryl ester was substantially complete.

EXAMPLE XVI

About 200 parts by weight of product D, the self-esterified naphtha-insoluble acids produced in Example IV, was dehydroxylated by adding 100 parts by weight of refined xylenes and 5 parts of benzene sulfonic acid and refluxing the mixture at a temperature of about 150° C. for 30 hours. The amount of water collected in a water trap placed in the reflux line indicated that dehydroxylation was substantially complete. The resulting product was freed of catalyst by extraction with sodium carbonate followed by water washing and xylene was removed by evaporation. This dehydroxylated self-esterified naphtha-insoluble acid fraction will be referred to as product G.

EXAMPLE XVII

About 50 parts by weight of product G, 30 parts by weight of lauryl alcohol and 25 parts by weight of refined xylenes were refluxed for approximately 18 hours at a temperature of about 150° C. A water trap placed in the reflux line removed water as it was formed. The amount of water collected and the titration data showed that esterification was substantially complete. After removal of the xylenes by evaporation the lauryl ester product was a reddish-brown viscous liquid.

EXAMPLE XVIII

A second 50 parts by weight of product G, 6.5 parts by weight of pentaerythritol and 25 parts by weight of refined xylene were placed in a flask fitted with a reflux condenser and a water trap. The mixture was refluxed for approximately 4 hours at 150° C., at which time gelation occurred. The amount of water collected and titration data obtained on the gelled product showed that esterification was approximately 50% complete.

EXAMPLE XIX

About 100 parts by weight of product D, 5 parts of benzene sulfonic acid and 45 parts by weight of refined xylenes and about 125 parts by weight of lauryl alcohol were refluxed for 30 hours at 150° C. Examination of the product showed that esterification with lauryl alcohol and dehydroxylation of the acids had occurred during this treatment. The product was thus principally the lauryl ester of unsaturated naphtha-insoluble acids.

EXAMPLE XX

The effect of rosin on dehydroxylation and esterification of naphtha-insoluble acids is shown by the following series of experiments.

In the first experiment about 100 parts by weight of product B, 12 parts by weight of glycerol and 4.5 parts by weight of refined xylenes were placed in a flask fitted with a reflux condenser and water trap and the mixture was refluxed while maintaining the flask contents at about 200° C. At the end of about 3.5 hours of refluxing the reaction mixture had gelled.

In a second experiment about 80 parts of product B, 22 parts by weight of purified rosin, 12 parts by weight of glycerol and 4.5 parts by weight of refined xylenes were refluxed at 200° C. At the end of 4.5 hours the reaction mixture had gelled and the refluxing was discontinued.

In a third experiment 72 parts by weight of product B, 30 parts by weight of purified rosin, 12 parts by weight of glycerol and 4.5 parts by weight of refined xylenes were refluxed at 200° C. Gelation occurred after 5.5 hours of refluxing.

In a fourth experiment about 67 parts by weight of product B, 36 parts by weight of purified rosin, 12 parts by weight of glycerol and 4.5 parts by weight of refined xylenes were refluxed at 200° C. Gelation occurred after 6.5 hours of refluxing and the heating was discontinued.

In each of the foregoing experiments the amount of esterification and the extent of dehydroxylation were determined from titration data and the amount of water liberated during the refluxing. Data for the 4 experiments are summarized in the following table and show the effect of varying proportions of rosin.

*Table 1*

| Rosin, Percent by Weight[1] | Time at Which Gelation Occurred, Hours | Esterification Percent Completed | Dehydroxylation Percent Completed |
|---|---|---|---|
| 0 | 3.5 | 68 | 45 |
| 21.5 | 4.5 | 70 | 58 |
| 29.4 | 5.5 | 70 | 72 |
| 35 | 6.5 | 70 | 92 |

[1] Based on the total weight of product B plus rosin.

It will be observed that the presence of rosin delays the gelling time and permits dehydroxylation to take place to a greater extent without resulting in gelation than is obtainable in the absence of rosin. As the amount of rosin is increased the extent of dehydroxylation can also be increased without resulting in a gelled product. Apparently the presence of rosin does not appreciably alter the extent of esterification.

The gelled products obtained in the above experiments are useful in the preparation of resins and as resin modifiers. Due to the lack of compatibility of these gelled products with ordinary thinners and their limited solubility in aromatic solvents, these materials are not useful in drying oil compositons or in the preparation of varnishes and the like. In such utilizations it is desirable that the unsaturated esters are oil-soluble. Such oil-soluble esters may be produced by discontinuing the esterification reaction at a point before gelation occurs. Thus, satisfactory products for this purpose were obtained by repeating the 4 above experiments and discontinuing the heating and refluxing after 2.5, 3.5, 4.5, and 5.5 hours, respectively. All of the resulting products were soluble in aromatic solvents and films of the products on metal strips were evaluated and found to give coatings of varying characteristics. It was found that the products containing rosin during the esterification gave tougher and faster drying films than the one prepared without rosin. Moreover, the product containing the highest proportion of rosin, which product was the most completely dehydroxylated (approximately 82%), was the product with the best drying properties.

The above experiments repeated with pentaerythritol in place of glycerol gave very similar results. Gelation occurred after the same period of heating in each of the 4 cases and the products obtained by stopping the reaction approximately 1 hour before gelation would occur gave film-forming products having drying properties.

EXAMPLE XXI

The following experiments further illustrate the presence of rosin and a catalyst during esterification and dehydroxylation of naphtha-insoluble acids.

In the first experiment 100 parts by weight of product B, 12 parts by weight of glycerol, and 9.5 parts by weight of toluene were heated and refluxed at 140° C. Gelation occurred after 16 hours.

In a second experiment 100 parts by weight of product B, 5 parts by weight of benzene sulfonic acid, 12 parts by weight of glycerol and 9 parts by weight of toluene were refluxed at a temperature of 140° C. for about 50 minutes, when gelation occurred and the reaction was discontinued.

In a third experiment 80 parts by weight of product B, 22 parts by weight of rosin, 12 parts by weight of glycerol and 9.5 parts by weight of toluene were refluxed at a temperature of 140° C. After about 22 hours the reaction mixture gelled and refluxing was discontinued.

In a fourth experiment 80 parts by weight of product B, 22 parts by weight of rosin, 12 parts by weight of glycerol, 5 parts by weight of benzene sulfonic acid and 9.5 parts by weight of toluene were refluxed at a temperature of 140° C. At the end of 2 hours and 10 minutes the reaction mixture had gelled and refluxing was discontinued.

In each of the foregoing reactions the extent of esterification and dehydroxylation was determined and the following table summarizes these data.

Table 2

| Rosin, Percent by Weight | Catalyst, Percent by Weight | Time at Which Gelation Occurred, Hrs. | Esterification, Percent Completed | Dehydroxylation, Percent Completed |
|---|---|---|---|---|
| 0 | 0 | 16 | 71 | 21 |
| 0 | 5 | 0.83 | 77 | 45 |
| 21.5 | 0 | 22 | 63 | 56 |
| 21.5 | 5 | 2.17 | 65 | 100 |

These data show that at the lower temperatures employed, i. e. 140° C., rosin promotes dehydroxylation or permits more extensive dehydroxylation without gelation occurring and that this effect is particularly noticeable when a catalyst is employed. Substantially complete dehydroxylation is obtainable where 21.5% of rosin was employed together with benzene sulfonic acid as a catalytic agent.

Although the above gelled products are useful in the preparation of resins, modified resins and the like, because of their insolubility in aromatic solvents they are generally not satisfactory as drying oils or drying oil modifiers or extenders. In order to prepare esters having value as drying oil modifiers or extenders the 4 experiments described above were repeated, but in each case the reactions were discontinued before gelation occurred. Thus, in the 4 experiments the refluxing time was reduced to 14, 0.6, 17 and 1.9 hours, respectively. The resulting products were completely miscible with aromatic solvents such as toluene and xylene. The two products containing catalyst were separately treated with an amount of sodium carbonate just sufficient to neutralize the catalytic agent and then water washed to remove the sodium benzene sulfonate. Xylene solutions were prepared containing 10% by weight of each of the four aromatic-soluble products just prepared and 0.1% by weight, based on the solvent-free product, of calcium naphthenate containing about 6% by weight of cobalt was added to each of the xylene solutions. Metal panels were coated with each of the four mixtures and it was observed that the two rosin-containing samples yielded harder and tougher films and also dried more quickly than the non-rosin-containing preparations. The non-rosin-containing preparations yielded dried films which are useful but are, nevertheless, inferior to those obtained with the use of rosin.

The experiments described in this example were each repeated using a mixture of equal parts of rosin and turpentine in place of the rosin employed in these experiments. The results, i. e. the reaction times and the characteristics of the products, were similar to those obtained using rosin.

EXAMPLE XXII

A series of experiments was carried out to show the effect of styrene as a gelation inhibitor in the esterification and dehydroxylation of naphtha-insoluble acids. In this series of experiments about 100 parts by weight of product B, 12 parts by weight of glycerol and about 9.5 parts by weight of xylenes were refluxed in the presence and absence of styrene and in the presence and absence of benzene sulfonic acid, as indicated in the following table, until gelation occurred. The extent of esterification and dehydroxylation were determined by titration data and by the amount of water formed during the reaction. The results of this experimental work are shown in Table 3.

Table 3

| Experiment Number | Styrene Percent by Weight | Benzene Sulfonic Acid Percent by Weight[1] | Time at Which Gelation Occurred Hours | Esterification, Percent Completed | Dehydroxylation, Percent Completed |
|---|---|---|---|---|---|
| 1 | 0 | 0 | 10 | 71 | 21 |
| 2 | 15 | 0 | 11 | 63 | 30 |
| 3 | 200 | 0 | 15 | 65 | 35 |
| 4 | 15 | 0.5 | 1.2 | 64 | 50 |
| 5 | 15 | 5.0 | 1.8 | 72 | 73 |
| 6 | 0 | 5.0 | 0.6 | 79 | 54 |

[1] Based on the weight of the Product B.

These six experiments were repeated using shorter refluxing times in order to obtain products which were free from gelation and still miscible with aromatic solvents. The refluxing times employed were 8, 9, 12, 1, 1.5 and 0.4 hours, respectively. The catalyst was removed from each of the three cataylst-containing products by extraction with aqueous sodium carbonate as previously described.

Each of the six products was evaluated for drying properties as described in Example XXI. The catalytically dehydroxylated samples in which styrene was employed produced films having the shortest drying times and gave the most desirable coatings. The sample prepared with 200% by weight of styrene gave a remarkably tough and resilient film. All samples prepared with styrene had superior drying properties as compared with the samples which did not contain styrene.

EXAMPLE XXIII

About 33 parts by weight of product B, 12 parts by weight of maleic anhydride, 12 parts by weight of glycerol and 9 parts by weight of xylene were heated and refluxed at a temperature of about 180° C. for 1.75 hours. At this time the product was gelled. Esterification was found to be approximately 73% complete. The product was a crumbly, solid mass having a gel-like structure.

The experiment was repeated with the exception that refluxing was discontinued after 1.25 hours and the reaction mixture cooled. The homogeneous reaction product was approximately 52% esterified. Upon evaporation of the solvent there remained a resinous material completely devoid of gel structure and being capable of forming long threads.

EXAMPLE XXIV

About 33 parts by weight of product B, 12 parts by weight of maleic anhydride, 12.5 parts by weight of pentaerythritol and 9 parts by weight of toluene were placed in a flask fitted with a reflux condenser and water trap and refluxed for 2.5 hours at 150° C. In this time gelation occurred and the reaction mixture was cooled. When the experiment was liberated and the refluxing discontinued after 1.8 hours the reaction product was miscible with aromatic solvents.

EXAMPLE XXV

Examples XXII and XXIII were repeated using the dehydroxylated self-esterified naphtha-insoluble acids described above as product G in place of product B. Refluxing was discontinued prior to the gelation stage. The resulting products possessed drying properties similar to the drying properties of the products of Examples XXII and XXIII when tested as described in these examples.

EXAMPLE XXVI

About 100 parts by weight of product A, together with about 4 equivalents of methanol, based on the acid groups, were combined in a vessel, and about 3 parts by weight of 66° Bé. sulfuric acid was added. The mixture was then refluxed for five hours whereupon it was found that esterification was 90% complete. Methoxyl determinations on the purified product showed that esterification had occurred on the free carboxyl groups. The product was a distillable viscous oil, 85% soluble in light petroleum spirit.

EXAMPLE XXVII

One hundred parts of product B were saponified by heating with a five per cent excess of aqueous sodium hydroxide at about 100° C. for 1.5 hours. The soap system was then carefully decomposed by the addition of cooled diluted sulfuric acid equivalent in amount to the sodium hydroxide employed. The organic acid phase was diluted with xylene and separated, then washed twice with 4 volumes of hot water. A test portion of the xylene-free acid gave a saponification number-acid number ratio of 1.2 in contrast to the ratio of product B which was about 2.0. The calculated yield, xylene-free, was 92 parts. This material is designated hereafter as product H.

EXAMPLE XXVIII

The normal butyl ester of product H was prepared according to the method of Example V. The consumption of butanol was measured and found to be consistent with the results of a butoxyl determination on the finished ester. The results indicated 75% esterification of the total carboxyl groups. This value, however, was less than the observed esterification measured by increase in saponification number. The disparity indicated that about 15% of the acid groups reverted to inner esters during the process. The measurement of water revolved suggested a small amount of dehydroxylation. The product is designated as product I.

The product was found to be considerably more stable to distillation than the corresponding butyl ester of product D and was almost completely soluble in light petroleum spirit.

EXAMPLE XXIX

A portion of product I, the butyl ester of product H, was subjected to dehydroxylation according to the method of Example XIV, with essentially the same results.

EXAMPLE XXX

A portion of product H was subjected to esterification-dehydroxylation in the presence of rosin as outlined in the fourth experiment of Example XXI but with adjustment in the amount of glycerol equivalent to the increased acidity of product H. About 70% esterification was found and 90% dehydroxylation. The product resembled raw rubber after the unreacted residues were removed.

EXAMPLE XXXI

Portions of product C were used in the preparation of esters according to the methods outlined

We claim:

1. A process for the production of normally liquid high molecular weight naphtha-insoluble acids from paraffin wax which comprises oxidizing a refined paraffin wax containing between about 15 and 50 carbon atoms per molecule and having a melting point between about 32° C. and 95° C. in the liquid phase at a pressure between atmospheric and 20 atmospheres with a gas containing free oxygen at a temperature between about 100° C. and about 140° C. until the oxidized product is non-waxy and fluid at ordinary temperatures and has an acid number between 240 and 300 mg. KOH/g., water washing the oxidized wax to remove water-soluble components and separating a normally liquid naphtha-insoluble acid fraction from the water-washed oxidized product.

2. A process according to claim 1 in which the paraffin wax has a melting point between 45° C. and 75° C. and the acid number of the normally liquid oxidized product is between 250 and 290 mg. KOH/g.

3. A process for the production of naphtha-insoluble acids having a ratio of total oxygen to carboxyl oxygen of between 1.4 and 1.6, an acid number between about 145 and 185 and a saponification number-acid number ratio of between 1.6 and 2.2 from paraffin wax which comprises oxidizing a refined paraffin wax containing between about 15 and 50 carbon atoms per molecule and having a melting point between about 32° C. and 95° C. in the liquid phase at a pressure between atmospheric and 20 atmospheres with a gas containing free oxygen at a temperature between about 100° C. and 140° C. until the oxidized product is non-waxy and fluid at ordinary temperatures and has an acid number between 240 and 300 mg. KOH/g., water washing the oxidized product to remove water-soluble components and extracting the water-insoluble oxidized wax with petroleum naphtha to obtain a naphtha-insoluble fraction.

4. A method of treating paraffin wax to produce unsaturated, high molecular weight naphtha-insoluble acids therefrom which comprises air blowing a refined paraffin wax having a melting point between about 32° C. and about 95° C. in the liquid phase at a pressure between about atmospheric pressure and 20 atmospheres pressure and a temperature between about 100° C. and about 140° C. until the acid number of the product is between 240 and 300 mg. KOH/g., separating a water-insoluble naphtha-insoluble fraction from the oxidized product and heating said water-insoluble naphtha-insoluble fraction at a temperature between 90° C. and 200° C. in the presence of a water entraining agent until the ratio of total oxygen to carboxyl oxygen is between about 1 and about 1.25.

5. A method for the treatment of a paraffin wax to produce a resin plasticizer which comprises air blowing a refined paraffin wax at a temperature between 100° C. and 140° C. and at a pressure between atmospheric pressure and 20 atmospheres pressure until the oxidized product has an acid number between 240 and 300 mg. KOH/g., separating a water-insoluble naphtha-insoluble fraction from the oxidized wax, esterifying said separated water-insoluble naphtha-insoluble fraction with an alcohol containing less than 3 hydroxyl groups per molecule at a temperature between 50° C. and 200° C., sufficient to effect esterification.

6. A method according to claim 5 in which said esterification is effected at temperatures between about 100° C. and about 200° C. to cause simultaneous esterification and dehydroxylation.

7. A method according to claim 5 in which said esterification is effected at temperatures of between about 100° C. to 150° C. in the presence of an esterification catalyst to cause simultaneous esterification and dehydroxylation.

8. A method for the treatment of paraffin wax to produce a film-forming resin therefrom which comprises air blowing a refined paraffin wax at a temperature between 100° C. and 140° C. and at a pressure between atmospheric and 20 atmospheres pressure until the product has an acid number between 240 and 300 mg. KOH/g., separating a water-insoluble naphtha-insoluble fraction from the air blown wax, esterifying said separated water-insoluble naphtha-insoluble fraction with an alcohol having at least 3 hydroxyl groups at a temperature between 90° C. and 200° C., sufficient to effect esterification and dehydroxylation of the water-insoluble naphtha-insoluble fraction.

9. A method according to claim 8 in which the esterification and dehydroxylation is effected at a temperature of about 145° C. and in which xylene is employed as an entrainer to remove water produced during the esterification-dehydroxylation reaction.

10. A method according to claim 8 in which said esterification and dehydroxylation is effected at a temperature of about 100° C. in the presence of an esterification catalyst and in which benzene is employed as an entrainer to remove water produced during the reaction.

11. A method according to claim 8 in which said esterification and dehydroxylation is effected in the presence of a non-gelation agent.

12. A method according to claim 11 in which said non-gelation agent is rosin.

13. A method according to claim 8 in which said alcohol is pentaerythritol.

14. A method according to claim 8 in which said heating is effected in the presence of rosin as a non-gelation agent and in which said alcohol is glycerol.

15. A method of converting paraffin wax into a naphtha-insoluble acidic material containing a ratio of total oxygen to carboxyl oxygen of between 1.4 and 1.6 which comprises air blowing a refined paraffin wax at a temperature between 100° C. and 140° C. and at a pressure between atmospheric and 20 atmospheres pressure until the oxidized product has an acid number between 240 and 300 mg. KOH/g., separating a water-insoluble naphtha-insoluble fraction from the oxidized wax, separating a naphtha-soluble fraction from the oxidized product and separately air blowing said naphtha-soluble fraction at a temperature between 100° C. and 140° C. and at a pressure between atmospheric and 20 atmospheres pressure until the acid number of the product is between about 250 and 290 mg. KOH/g., water washing said last named oxidized product and combining the water-insoluble fraction with the water-insoluble naphtha-insoluble fraction from the first oxidation.

16. A modified alkyd resin prepared by reacting a compound of the class consisting of polycarboxylic acids and their anhydrides, a naphtha-insoluble acidic fraction obtained by oxidizing paraffin wax and a poly alcohol at a temperature between 90° C. and 200° C. for a time sufficient to effect esterification and polymerization, said naphtha-insoluble fraction of oxidized wax being prepared by air blowing a refined paraffin wax at a temperature between 100° C. and 140° C. and at a pressure between atomspheric and 20 atmospheres pressures until the oxidized product has an acid number between 240 and 300 mg. KOH/g., and separating a water-insoluble naphtha-insoluble fraction from the oxidized wax.

17. A modified alkyd resin prepared by heating 1 part of a compound selected from the class consisting of polycarboxylic acids and anhydrides of polycarboxylic acids, between 0.05 and 0.5 part of a naphtha-insoluble acidic fraction obtained by oxidizing paraffin wax and an amount of a poly alcohol equivalent to the total acid at a temperature between about 90° C. and 200° C. for a time sufficient to effect esterification and polymerization, said naphtha-insoluble acidic fraction being prepared by air blocking a refined paraffin wax in the liquid phase at a temperature between 100° C. and 140° C. and a pressure between atmospheric and 20 atmospheres until the product has an acid number between about 240 and 300 mg. KOH/g., water washing the product to remove water-soluble constituents and separating a naphtha-insoluble fraction from the water-washed product.

18. A modified alkyd resin according to claim 17 in which said naphtha-insoluble acidic fraction has an acid number of between 145 and 185 mg. KOH/g. and a ratio of total oxygen to carboxyl oxygen of between about 1.4 and about 1.6.

19. A method of treating paraffin wax to prodduce normally liquid high molecular weight naphtha-insoluble acids having a total oxygen to carboxyl oxygen ratio of between 1.4 and 1.6 and a saponification number-acid number ratio between about 1.15 and about 1.4 which comprises air blowing a refined paraffin wax having a melting point between about 32° C. and 95° C. in the liquid phase at a pressure between atmospheric and 20 atmospheres pressure and at a temperature between about 100° C. and about 140° C. until the oxidized product is non-waxy and fluid at ordinary temperatures and has an acid number between 240 and 300 Mg. KOH/g., water washing the oxidized wax to remove water-soluble components, separating a normally liquid naphtha-insoluble fraction from the water-washed product, treating said last-named fraction with sodium hydroxide and decomposing the resulting soaps by the addition of cooled dilute mineral acid to reform the naphtha-insoluble acids in a form relatively free from inner esters.

20. A method for the treatment of paraffin wax to produce an ester which comprises air blowing a refined paraffin wax at a temperature between 100° C. and 140° C. and at a pressure between atmospheric and 20 atmospheres pressure until the oxidized product has an acid number between 240 and 300 mg. KOH/g., water washing the resulting oxidized wax to remove water-soluble components, extracting the water-washed oxidized wax with naphtha to obtain a naphtha-insoluble fraction having a ratio of total oxygen to carboxyl oxygen between 1.4 and 1.6, treating said last-named fraction with sodium hydroxide and decomposing the resulting soaps by the addition of cooled dilute mineral acid to obtain the naphtha-insoluble acids in a form relatively free from inner esters and esterifying said naphtha-insoluble acids relatively free from inner esters with an alcohol at a temperature between 50° C. and 200° C.

21. A mixture of high molecular weight carboxylic acids having a ratio of total oxygen between 1.4 and 1.6 and an acid number between 145 and 185 mg. KOH/g. obtained by air blowing a refined paraffin wax at a temperature between 100° C. and 140° C. and at a pressure between atmospheric and 20 atmospheres pressure until the oxidized product has an acid number between 240 and 300 mg. KOH/g., extracting the oxidized wax with water to remove low molecular weight water soluble oxidation products and extracting the water-insoluble fraction with petroleum naphtha to remove naphtha-soluble materials.

ORVILLE L. POLLY.
ORIN D. CUNNINGHAM.

REFERENCES CITED

The following references are of record in the file of this patent:

UNITED STATES PATENTS

| Number | Name | Date |
| --- | --- | --- |
| 2,153,302 | Ewing | Apr. 4, 1939 |
| 2,486,454 | Zellner | Nov. 1, 1949 |
| 2,486,455 | Zellner | Nov. 1, 1949 |

FOREIGN PATENTS

| Number | Country | Date |
| --- | --- | --- |
| 764,948 | France | May 30, 1934 |